Dec. 14, 1926.  
F. WILSON, SR  
DIFFERENTIAL AXLE  
Filed Feb. 9, 1926

1,610,641

INVENTOR,
Frank Wilson Sr.
BY
ATTORNEY.

Patented Dec. 14, 1926.

1,610,641

UNITED STATES PATENT OFFICE.

FRANK WILSON, SR., OF LOS ANGELES, CALIFORNIA, ASSIGNOR TO ANNIE WILSON REBOUL, OF LOS ANGELES, CALIFORNIA.

DIFFERENTIAL AXLE.

Application filed February 9, 1926. Serial No. 87,004.

The primary object of my invention is to provide a differential axle for use on railway cars, motor vehicles and vehicles generally which are equipped with one or more live axles.

A further object is to provide a differential axle for general use which is so simple in construction that it readily may be adapted to different uses and at the same time is so strong that it is thoroughly reliable.

Other objects and advantages will appear hereinafter and while I show herewith and will describe a preferred form of construction, I desire it to be understood that I do not limit my invention to such preferred form but that various changes and adaptations may be made therein without departing from the spirit of my invention as hereinafter claimed.

Referring to the drawings which accompany this specification and form a part thereof:

Figure 1:
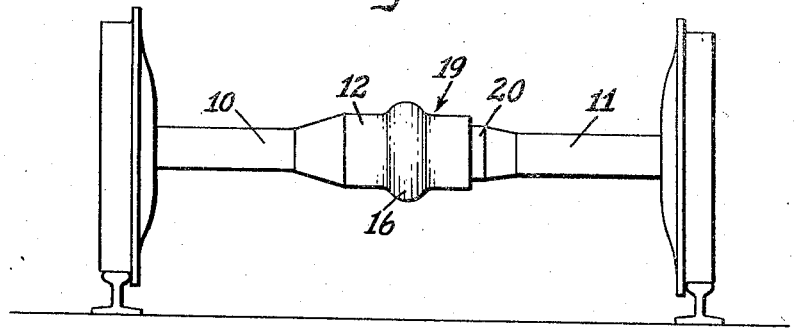
Fig. 1, is a view in elevation of one form of my differential axle, associated with a pair of railway car wheels.
Figure 2:
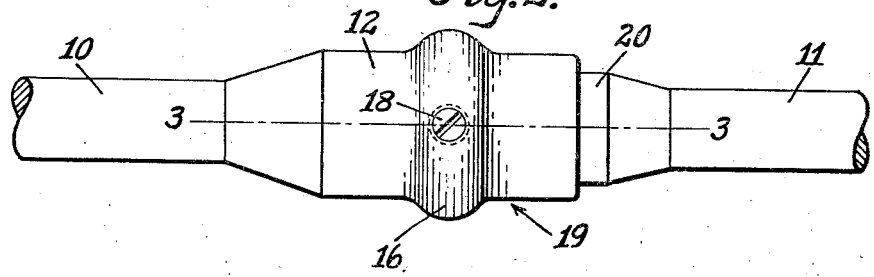
Fig. 2, is an enlarged fragmentary view of the axle shown in Fig. 1.
Figure 3:
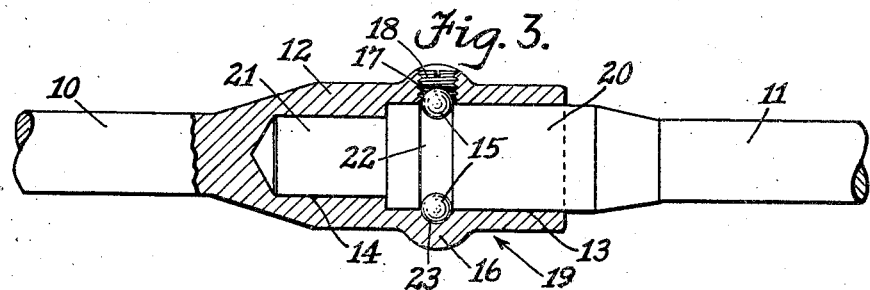
Fig. 3, is a longitudinal sectional view of the part of the axle shown in Fig. 2.

As is clearly shown in Fig. 3, the axle is made in two parts, 10 and 11, part 10 having an enlarged end section 12 with a relatively large axial bore 13 extending part way of the enlarged section, a reduced bore 14 in longitudinal axial alignment with the larger bore 13 and an annular groove 15, semicircular in cross-section, in the wall of the larger bore near its inner end, said wall having an external annular fillet 16, to provide extra thickness at the point of the groove. A radial aperture 17, threaded to receive a screw-plug 18, is made through the filleted wall 16 of the socket 19 thus formed, so that the axis of said aperture intersects the central line of said annular groove 15.

Part 11 of the axle has an enlarged section 20, of a diameter slightly less than that of bore 13, near its end and a reduced end-section 21, of a diameter slightly less than that of bore 14. The enlarged section 20, or journal section, also has an annular groove 22, semicircular in cross-section, near its inner end, said groove 22 being complementary to groove 15, so that when parts 10 and 11 are brought together with bores 13 and 14 of the former engaging sections 20 and 21, respectively, of the latter, annular grooves 15 and 22 combine to form a ball-race for balls 23, which are of a size to pass freely through aperture 17, and the two parts 10 and 11 of the shaft may turn freely with reference to each other on the ball bearings thus provided. It will be seen that when the balls are in place, parts 10 and 11 of the axle are firmly held thereby against endwise movement with reference to each other. After the balls are in place screwplug 18 may be screwed into the aperture and, if desired, may be fastened so that it cannot work out by fusing, brazing or other means.

Figure 4:
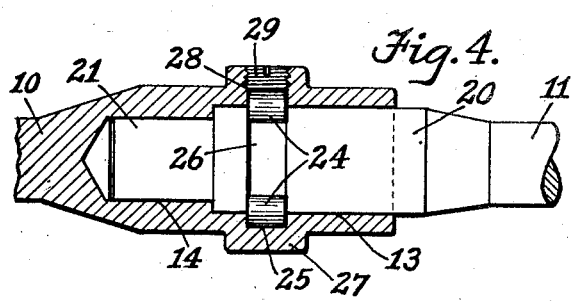
Fig. 4, is a sectional view, similar to Fig. 3, of a slightly modified form of differential axle.

The modified form of axle shown in Fig. 4 differs from the one described only in having rollers 24 instead of balls 23 and in having complementary grooves 25 and 26, in the socket 19 and enlarged section 20, respectively, of axle-parts 10 and 11, respectively, which are rectangular instead of semi-circular in cross-section. The socket in this case also has an annular ridge or collar 27 to provide extra thickness in that part thereof in which groove 25 is formed. A screw-threaded aperture 28, large enough to admit the rollers 24, is made through collar 27 and a screw-plug 29 is screwed therein to close the aperture, as in the first form.

It will be seen that either of the two forms described provides a jointed axle the two parts of which may turn freely upon each other so that the two wheels fixed on the outer ends thereof may turn at different rates. Furthermore, there is no endwise motion between the two parts of the axle and the construction thereof is such as to provide ample strength in the axle as a whole.

The two parts are assembled, as is evident, by inserting sections 20 and 21, of part 11, into socket 19 of part 10, dropping balls 23 or rollers 24 through apertures 17 or 28, respectively, until the races are properly filled and screwing plugs 18 or 29 into apertures 17 or 28, respectively, to close said apertures and thus retain said balls or rollers in their channels or races. That the differential axle thus provided readily may be adapted to various uses is sufficiently evident without further illustration.

Having thus shown and described my invention, I claim:

A differential axle comprising two longitudinally aligned shaft-parts, a socket formed on the adjacent end of one shaft-part, a journal-section formed on the adjacent end of the other shaft-part, said journal-section being adapted to turn within said socket, complementary channels formed in said socket and on said journal-section at a distance from the mouth of said socket, so as to co-operatively provide a race for rollers, rollers mounted in the race thus provided, whereby the shaft-parts are held against longitudinal movement with reference to each other, there being an annular ridge or collar to provide extra thickness of the wall of said socket opposite said race.

FRANK WILSON, Sr.